(12) United States Patent
Chen et al.

(10) Patent No.: US 9,122,676 B2
(45) Date of Patent: Sep. 1, 2015

(54) LICENSE RECONCILIATION WITH MULTIPLE LICENSE TYPES AND RESTRICTIONS

(71) Applicant: International Business Machines Corporation, Armonk, NY (US)

(72) Inventors: Han Chen, White Plains, NY (US); Hui Lei, Scarsdale, NY (US); Liangzhao Zeng, Mohegan Lake, NY (US); Zhe Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 13/650,704

(22) Filed: Oct. 12, 2012

(65) Prior Publication Data
US 2014/0108404 A1    Apr. 17, 2014

Related U.S. Application Data

(63) Continuation of application No. 13/650,542, filed on Oct. 12, 2012.

(51) Int. Cl.
G06F 17/30    (2006.01)
G06F 21/10    (2013.01)

(52) U.S. Cl.
CPC ............... *G06F 17/30* (2013.01); *G06F 21/105* (2013.01); *G06F 17/30289* (2013.01)

(58) Field of Classification Search
CPC .......... G06F 17/3071; G06F 17/30864; G06F 17/30598; G06F 21/10; G06F 21/31; G06F 8/61; G06F 17/30289; G06F 17/30303; G06F 21/105; G06Q 20/382; G06Q 20/3674; G06Q 10/00; H04L 29/08981; G11B 20/00086
USPC ...................... 707/737, 719, 804; 705/36, 50; 717/176, 139, 136, 140, 146, 153; 726/31, 28, 26, 29, 30
See application file for complete search history.

(56) References Cited

U.S. PATENT DOCUMENTS

| 804,164 | A | 11/1905 | Orcutt | |
|---|---|---|---|---|
| 6,056,786 | A | 5/2000 | Rivera et al. | |
| 7,171,662 | B1 | 1/2007 | Misra et al. | |
| 8,856,757 | B2 * | 10/2014 | Lei et al. | 717/139 |
| 8,856,758 | B2 * | 10/2014 | Lei et al. | 717/139 |
| 2001/0013024 | A1 * | 8/2001 | Takahashi et al. | 705/59 |
| 2003/0055749 | A1 * | 3/2003 | Carmody et al. | 705/28 |
| 2008/0028218 | A1 * | 1/2008 | Simon | 713/170 |
| 2008/0133324 | A1 * | 6/2008 | Jackson et al. | 705/10 |
| 2008/0148253 | A1 * | 6/2008 | Badwe et al. | 717/174 |

(Continued)

*Primary Examiner* — Jean M Corrielus
(74) *Attorney, Agent, or Firm* — Ryan, Mason & Lewis, LLP

(57) ABSTRACT

Techniques for license reconciliation with multiple license types and restrictions includes grouping a collection of multiple software installation instances, a collection of multiple hardware devices and a collection of multiple software licenses into multiple clusters, generating a reconciliation matrix for each cluster, wherein each row in the reconciliation matrix represents a software installation instance or a hardware device, each column in the reconciliation matrix represents a license type and/or an individual license, and each cell in the reconciliation matrix represents a license requirement and applicability of each software installation instance or hardware device, solving each reconciliation matrix, and generating a license reconciliation plan based on the solved reconciliation matrices.

19 Claims, 3 Drawing Sheets

(56) References Cited

U.S. PATENT DOCUMENTS

| | | |
|---|---|---|
| 2009/0158438 A1* | 6/2009 | Pichetti et al. ............... 726/26 |
| 2009/0228984 A1 | 9/2009 | Sterin |
| 2009/0249494 A1* | 10/2009 | Disciascio et al. ............ 726/31 |
| 2010/0250730 A1* | 9/2010 | Menzies et al. ............ 709/224 |
| 2011/0113493 A1* | 5/2011 | Moore ............................ 726/30 |
| 2011/0154330 A1* | 6/2011 | Axnix et al. ...................... 718/1 |
| 2012/0030072 A1* | 2/2012 | Boudreau et al. ............... 705/30 |
| 2012/0130911 A1* | 5/2012 | Maclellan et al. ............ 705/310 |
| 2012/0204270 A1* | 8/2012 | Paulino et al. .................. 726/28 |
| 2013/0054492 A1* | 2/2013 | Boudreau et al. ............. 705/400 |
| 2013/0074189 A1* | 3/2013 | Boudreau et al. ............... 726/26 |

* cited by examiner

LICENSE RECONCILIATION WITH MULTIPLE LICENSE TYPES AND RESTRICTIONS

CROSS-REFERENCE TO RELATED APPLICATIONS

This application is a continuation of U.S. patent application Ser. No. 13/650,542, filed Oct. 12, 2012, and incorporated by reference herein.

FIELD OF THE INVENTION

Embodiments of the invention generally relate to information technology, and, more particularly, to license reconciliation technology.

BACKGROUND

Challenges exist within the area of license reconciliation. By way of example, consider the following common scenario. At the beginning of a billing cycle, a number of licenses are purchased. During the billing cycle, a number of products (such as software products) are installed and used. Subsequently, at the end of the billing cycle, a license reconciliation calculation is carried out to determine the entitlement of the licenses to the products and examine whether the current usage of the software products are fully entitled by the purchased licenses.

However, reconciliation logic used in existing approaches incurs heavy manual efforts and can present accuracy challenges. For instance, existing approaches include applying usable licenses to deployed software installations without optimizing the mix of license types and licenses within a type. This can lead to inaccurate reconciliation, which in turn causes false negatives and potentially increases licensing costs. On the other hand, in existing approaches that explore all possible license combinations, the reconciliation time will be prohibitively high.

Accordingly, a need exists to enable selection from multiple applicable licenses, considering license types and restrictions.

SUMMARY

In one aspect of the present invention, techniques for license reconciliation with multiple license types and restrictions are provided. An exemplary computer-implemented method for license reconciliation can include steps of grouping a collection of multiple software installation instances, a collection of multiple hardware devices and a collection of multiple software licenses into multiple clusters, generating a reconciliation matrix for each cluster, wherein each row in the reconciliation matrix represents a software installation instance or a hardware device, each column in the reconciliation matrix represents a license type and/or an individual license, and each cell in the reconciliation matrix represents a license requirement and applicability of each software installation instance or hardware device, solving each reconciliation matrix, and generating a license reconciliation plan based on the solved reconciliation matrices.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes intelligent license reconciliation with multiple license types and restrictions. At least one embodiment of the invention includes identifying a most cost-effective license entitlement plan from various possible plans. As detailed herein, such embodiments can include the use of combinatorial optimization techniques. As used herein, a license entitlement refers to the action of using a license on a software installation or a computing device running a software product.

At least one embodiment of the invention includes reducing the problem size by clustering licenses and products (such as software products) into groups, where each group is an independent problem. Additionally, a matrix can be created for each group, wherein such a matrix is a unified data representation marking the solution space. Further, at least one embodiment of the invention includes solving the matrix, for example, using algorithms inspired by heuristics for the generalized assignment problem (GAP) in combinatorial optimization. Also, each individual matrix for each group is solved, and ultimately, one solution is selected for each group.

Figure 1:
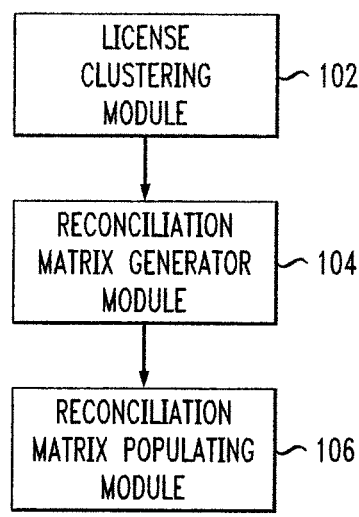
FIG. 1 is a block diagram illustrating example architecture, according to an aspect of the invention.

FIG. 1 is a block diagram illustrating example architecture, according to an aspect of the invention. By way of illustration, FIG. 1 depicts a license clustering module 102, a reconciliation matrix generator module 104 and a reconciliation matrix populating module 106. The license clustering module 102 groups all licenses and software products into clusters such that each cluster represents an independent reconciliation problem. This reduces the overall computational complexity. The reconciliation matrix generator module 104 generates an initial reconciliation matrix. In at least one embodiment of the invention, each row in the matrix represents a software product container, which is the basic unit of any entitlement decisions. Additionally, each column in the matrix is either a license type or an individual license.

For purposes of illustration, example embodiments described herein include example identifiers for the matrix cells. Accordingly, as used herein, "red" cells denote the amount of license demands, "brown" cells denote available license supplies, "green" cells denote valid entitlements, and "yellow" cells denote soft restrictions.

Figure 2:
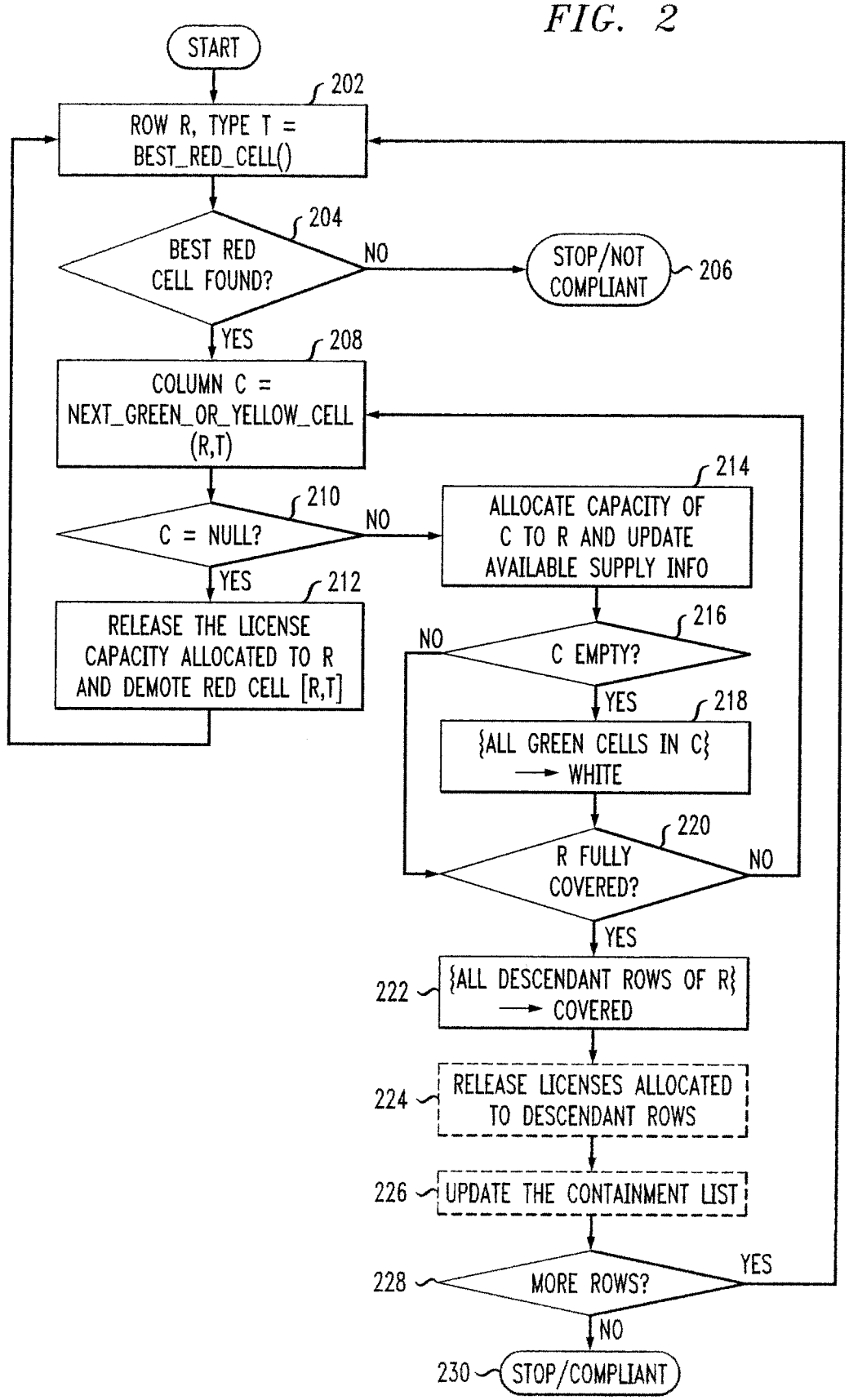
FIG. 2 is a flow diagram illustrating reconciliation techniques, according to an embodiment of the present invention.

As further depicted in FIG. 1, via the actions of the license clustering module 102 and reconciliation matrix generator module 104, the solution space of the combinatorial optimization problem is marked. In at least one example embodiment of the invention, the optimization problem can be seen as a special form of the generalized assignment problem (GAP). Accordingly, the reconciliation matrix populating module 106 solves each reconciliation matrix. By way of example, FIG. 2 depicts how each matrix is solved. Additionally, in at least one embodiment of the invention, three types of information are used to populate each matrix: 1) the available capacity, the type, and the constraints of each license; 2) the configurations (for example, number of processors) of each computing device; and 3) the information about what software products are installed on what computing devices, and what devices run on what other devices (for example, a virtual machine runs on a physical machine).

Further, in at least one embodiment of the invention, the most cost-effective entitlement is selected until the entire software inventory has been covered, or all licenses are used. Accordingly, for each cluster, a solution is derived.

FIG. 2 is a flow diagram illustrating reconciliation techniques, according to an embodiment of the present invention. As illustrated in FIG. 2, a function included in an example embodiment of the invention includes determining the most advantageous (for example, the most cost-effective) "red" cell (steps 202 and 204). (Also, if the most advantageous "red" cell is not found, the process stops (a determination of non-compliance) at step 206.) As noted above, "red" cells denote the amount of license demands of a software or hardware asset in a particular license type. Accordingly, such a function (best_red_cell( )) includes ranking all "red" cells based on performance/price ratio. As used herein, performance indicates the number of covered instances, and price is the relative quantity of consumed licenses (for example, the percentage of licenses consumed from the available capacity). By way of example, if there are 500 units of Processor Value Unit (PVU) available, and the row consumes 50 units, then Price=10% (0.1).

As also noted in FIG. 2, another function included in an example embodiment of the invention includes determining the next "green" or "yellow" cell (step 208). Namely, for a given red cell, there can be multiple green and yellow cells. To maximize the chance of license compliance, the green and yellow cells are ordered based on their license constraints. "Next" in this context refers to the first usable (with remaining capacity) green or yellow cell in the ranked list. As noted above, "green" cells denote valid entitlements, and "yellow" cells denote soft restrictions.

Accordingly, such a function (next_green_or_yellow_cell( )) includes maximizing the chance that the "green" cells have enough capacity to cover remaining rows in the matrix. As used herein, cover refers to the license capacity being greater than or equal to the license requirement of the software or hardware asset. Therefore, when applying the license to the software/hardware asset, the asset is fully entitled. This can be accomplished by ranking all licenses within a license type from most specific to most general. In this context, specific indicates that the license has more constraints, and general indicates that the license has fewer constraints.

Further, in at least one embodiment of the invention, metrics can be considered such as location, product version, software bundles, etc. Accordingly, at least one embodiment of the invention includes ranking all licenses by the number of software installations they can cover after the constraints are applied. Constraints include location, version, bundles, etc.

Accordingly, as further depicted in FIG. 2, if the function (Column C=next_green_or_yellow_cell(R,T)) is null (step 210), the license capacity allocated to row in question (R) is released and the red cell in question ([R, T]) is demoted (step 212). If the function is not null, step 214 includes allocating the capacity of column C to row R and updating available supply information. If column C is empty (step 216), all "green" cells in C are denoted white (step 218) and the process continues to step 220. Similarly, the column C is not empty, the process continues to step 220 to determine whether row R is fully covered. If row R is not fully covered, the process returns to step 208. If row R is fully covered, step 222 indicates that all descendant rows of R are denoted as covered.

Step 224 includes releasing licenses allocated to those descendant rows, while step 226 includes updating the containment list. Step 228 includes determining whether there are additional rows for analysis. If yes, the process returns to step 202. If no, the process stops (a determination of compliance) at step 230.

Figure 3:
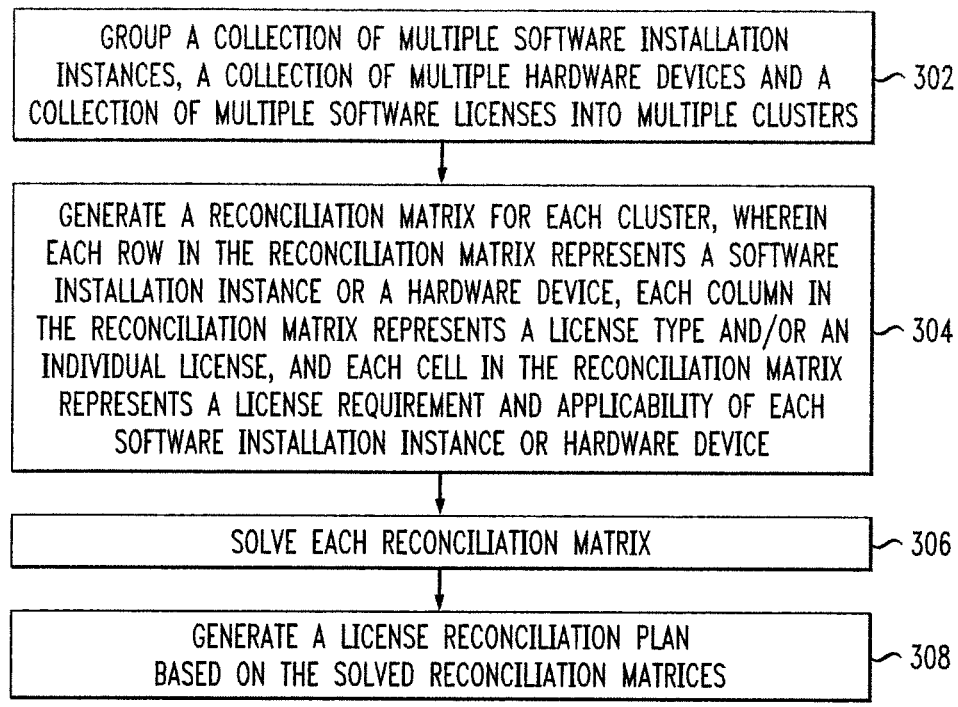
FIG. 3 is a flow diagram illustrating techniques for license reconciliation, according to an embodiment of the invention.

FIG. 3 is a flow diagram illustrating techniques for license reconciliation, according to an embodiment of the present invention. Step 302 includes grouping a collection of multiple software installation instances, a collection of multiple hardware devices and a collection of multiple software licenses into multiple clusters. The collection of multiple software licenses can include multiple capacity types (PVU, resource value unit (RVU), SERVER, etc.) and multiple restrictions (version, geographical, etc.).

Step 304 includes generating a reconciliation matrix for each cluster, wherein each row in the reconciliation matrix represents a software installation instance or a hardware device, each column in the reconciliation matrix represents a license type and/or an individual license, and each cell in the reconciliation matrix represents a license requirement and applicability of each software installation instance or hardware device. Each reconciliation matrix can include multiple cell types. For example, a reconciliation matrix can include a cell type representing an amount of license demand, a cell type representing available license supplies, a cell type representing a valid entitlement, and/or a cell type representing a restriction.

Step 306 includes solving each reconciliation matrix. The solving step can include selecting a license entitlement with smallest relative license consumption for each covered software installation instance and strictest set of license constraints.

Step 308 includes generating a license reconciliation plan based on the solved reconciliation matrices. Generating a license reconciliation plan can include ranking each of the solved reconciliation matrices based on a performance/price ratio, wherein performance indicates a number of covered software installation instances from the collection of multiple software installation instances, and price indicates a relative quantity of consumed licenses from the collection of multiple software licenses. Additionally, generating a license reconciliation plan can include ranking all licenses within each license type based on level of specificity. Analysis can also be performed with respect to a metric based on location, version, etc. By way of example, within a license type, the licenses with more restrictions (for example, can only be used on software version 10, rather than all versions), will be used first.

Further, generating a reconciliation matrix for each cluster can include encoding a license requirement of each software installation instance and/or set of software installation instances in a canonical data format. Additionally, at least one embodiment of the invention can include encoding available capacity information for each license in a canonical data format, encoding identification of each member of each set of software installation instances in a canonical data format, and/or encoding identification of each license belonging to each of one or more license types in a canonical data format.

The techniques depicted in FIG. 3 can additionally include assigning a license type to each software installation instance or hardware device. Further, at least one embodiment of the invention includes allocating an amount of license capacity from a software license within an assigned license type. Also, as described herein, generating a license reconciliation plan can include ranking each license type based on a performance/price ratio.

The techniques depicted in FIG. 3 can also, as described herein, include providing a system, wherein the system includes distinct software modules, each of the distinct software modules being embodied on a tangible computer-readable recordable storage to medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
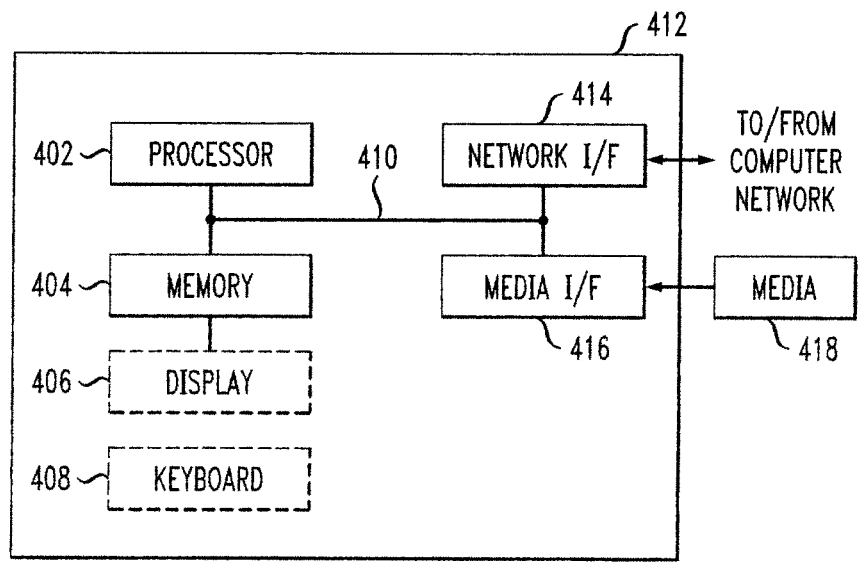
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing an intelligent license reconciliation with multiple license types and restrictions that is applicable with multiple data models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a computer readable storage medium having computer readable instructions tangibly embodied thereon which, when implemented, cause a computer to carry out a plurality of method steps comprising:
    grouping a collection of multiple software installation instances, a collection of multiple hardware devices and a collection of multiple software licenses into multiple clusters;
    generating a reconciliation matrix for each cluster, wherein each row in the reconciliation matrix represents a software installation instance or a hardware device, each column in the reconciliation matrix represents a license type and/or an individual license, and each cell in the reconciliation matrix represents a license requirement and applicability of each software installation instance or hardware device;
    solving each reconciliation matrix, wherein said solving comprises determining (i) a performance value for each reconciliation matrix and (ii) a price value for each reconciliation matrix, wherein said performance value indicates a number of covered software installation instances from the collection of multiple software installation instances, and wherein said price value indicates a relative quantity of consumed licenses from the collection of multiple software licenses; and
    generating a license reconciliation plan based on the solved reconciliation matrices, wherein said generating the license reconciliation plan comprises:
        ranking each of the solved reconciliation matrices based on a performance to price ratio, and wherein said performance to price ratio is determined for each solved reconciliation matrix based on said determined (i) performance value and (ii) price value for each reconciliation matrix; and
        identifying the most cost-effective solved reconciliation matrix, based on said ranking, as the license reconciliation plan.

2. The article of manufacture of claim 1, wherein the collection of multiple software licenses includes multiple capacity types and multiple restrictions.

3. The article of manufacture of claim 1, wherein the method steps comprise:
    assigning a license type to each software installation instance or hardware device.

4. The article of manufacture of claim 1, wherein the method steps comprise:
    allocating an amount of license capacity from a software license within an assigned license type.

5. The article of manufacture of claim 3, wherein generating a license reconciliation plan comprises ranking each license type based on a performance to price ratio.

6. The article of manufacture of claim 1, wherein the reconciliation matrix for each cluster comprises multiple cell types.

7. The article of manufacture of claim 6, wherein the multiple cell types comprise a cell type representing an amount of license demand, a cell type representing available license supplies, a cell type representing a valid entitlement, and a cell type representing a restriction.

8. The article of manufacture of claim 1, wherein said solving comprises selecting a license entitlement with a smallest relative license consumption for each covered software installation instance and strictest set of license constraints.

9. The article of manufacture of claim 1, wherein generating a license reconciliation plan comprises ranking all licenses within each license type based on level of specificity.

10. The article of manufacture of claim 9, wherein the method steps comprise:
    analyzing a metric based on location.

11. The article of manufacture of claim 9, wherein the method steps comprise:
    analyzing a metric based on software version.

12. The article of manufacture of claim 1, wherein generating a reconciliation matrix for each cluster comprises encoding a license requirement of each software installation instance and/or set of software installation instances in a canonical data format.

13. The article of manufacture of claim 1, wherein generating a reconciliation matrix for each cluster comprises encoding available capacity information for each license in a canonical data format.

14. The article of manufacture of claim 1, wherein generating a reconciliation matrix for each cluster comprises encoding identification of each member of each set of software installation instances in a canonical data format.

15. The article of manufacture of claim 1, wherein generating a reconciliation matrix for each cluster comprises encoding identification of each license belonging to each of one or more license types in a canonical data format.

16. A system for license reconciliation, comprising:
    at least one distinct software module, each distinct software module being embodied on a tangible computer-readable medium;
    a memory; and
    at least one processor coupled to the memory and operative for:
        grouping a collection of multiple software installation instances, a collection of multiple hardware devices and a collection of multiple software licenses into multiple clusters;
        generating a reconciliation matrix for each cluster, wherein each row in the reconciliation matrix represents a software installation instance or a hardware device, each column in the reconciliation matrix represents a license type and/or an individual license, and each cell in the reconciliation matrix represents a license requirement and applicability of each software installation instance or hardware device;

solving each reconciliation matrix, wherein said solving comprises determining (i) a performance value for each reconciliation matrix and (ii) a price value for each reconciliation matrix, wherein said performance value indicates a number of covered software installation instances from the collection of multiple software installation instances, and wherein said price value indicates a relative quantity of consumed licenses from the collection of multiple software licenses; and generating a license reconciliation plan based on the solved reconciliation matrices, wherein said generating the license reconciliation plan comprises:

ranking each of the solved reconciliation matrices based on a performance to price ratio, and wherein said performance to price ratio is determined for each solved reconciliation matrix based on said determined (i) performance value and (ii) price value for each reconciliation matrix; and identifying the most cost-effective solved reconciliation matrix, based on said ranking, as the license reconciliation plan.

17. The system of claim 16, wherein the collection of multiple software licenses includes multiple capacity types and multiple restrictions.

18. A method for license reconciliation, the method comprising:

grouping a collection of multiple software installation instances, a collection of multiple hardware devices and a collection of multiple software licenses into multiple clusters;

generating a reconciliation matrix for each cluster, wherein each row in the reconciliation matrix represents a software installation instance or a hardware device, each column in the reconciliation matrix represents a license type and/or an individual license, and each cell in the reconciliation matrix represents a license requirement and applicability of each software installation instance or hardware device;

solving each reconciliation matrix, wherein said solving comprises determining (i) a performance value for each reconciliation matrix and (ii) a price value for each reconciliation matrix, wherein said performance value indicates a number of covered software installation instances from the collection of multiple software installation instances, and wherein said price value indicates a relative quantity of consumed licenses from the collection of multiple software licenses; and generating a license reconciliation plan based on the solved reconciliation matrices, wherein said generating the license reconciliation plan comprises:

ranking each of the solved reconciliation matrices based on a performance to price ratio, and wherein said performance to price ratio is determined for each solved reconciliation matrix based on said determined (i) performance value and (ii) price value for each reconciliation matrix; and identifying the most cost-effective solved reconciliation matrix, based on said ranking, as the license reconciliation plan;

wherein at least one of the steps is carried out by a computer device.

19. The method of claim 18, wherein generating a reconciliation matrix for each cluster comprises:

encoding a license requirement of each software installation instance and/or set of software installation instances in a canonical data format;

encoding available capacity information for each license in a canonical data format;

encoding identification of each member of each set of software installation instances in a canonical data format; and encoding identification of each license belonging to each of one or more license types in a canonical data format.

* * * * *